(12) United States Patent
Ogi

(10) Patent No.: US 12,056,261 B2
(45) Date of Patent: Aug. 6, 2024

(54) LICENSE AUTHENTICATION DEVICE AND LICENSE AUTHENTICATION METHOD

(71) Applicant: Tokyo Electron Limited, Tokyo (JP)

(72) Inventor: Tomohide Ogi, Iwate (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 25 days.

(21) Appl. No.: 17/678,621

(22) Filed: Feb. 23, 2022

(65) Prior Publication Data
US 2022/0284134 A1    Sep. 8, 2022

(30) Foreign Application Priority Data

Mar. 4, 2021  (JP) .................. 2021-034277

(51) Int. Cl.
| | |
|---|---|
| G06F 21/12 | (2013.01) |
| G06F 21/10 | (2013.01) |
| G06F 21/30 | (2013.01) |
| G06F 21/44 | (2013.01) |
| G06F 21/73 | (2013.01) |
| G06F 21/79 | (2013.01) |

(52) U.S. Cl.
CPC .............. *G06F 21/73* (2013.01); *G06F 21/79* (2013.01)

(58) Field of Classification Search
CPC ........ G06F 21/73; G06F 21/79; G06F 21/121; G06F 21/44; G06F 21/10; G06F 21/105; G06F 21/30; G06F 2221/034
See application file for complete search history.

(56) References Cited

U.S. PATENT DOCUMENTS

| | | | | |
|---|---|---|---|---|
| 2009/0228982 A1* | 9/2009 | Kobayashi | .............. | G06F 21/10 726/26 |
| 2010/0071069 A1* | 3/2010 | Sugiura | ................. | G06F 21/121 726/26 |
| 2011/0010779 A1* | 1/2011 | Nakagawa | .............. | H04L 63/12 726/30 |
| 2011/0047615 A1* | 2/2011 | Chou | ...................... | G06F 21/10 726/19 |
| 2017/0180387 A1* | 6/2017 | Hayashi | ................ | H04L 63/102 |
| 2020/0042673 A1* | 2/2020 | Kidokoro | .............. | G06F 21/105 |
| 2021/0312015 A1* | 10/2021 | Nakajima | ............. | G06F 21/105 |

FOREIGN PATENT DOCUMENTS

JP    2007-193579 A    8/2007

* cited by examiner

*Primary Examiner* — Vu V Tran
(74) *Attorney, Agent, or Firm* — Venjuris, P.C.

(57) ABSTRACT

A license authentication device for a semiconductor manufacturing apparatus that provides a licensed function includes: an acquiring unit that acquires first information and second information from the semiconductor manufacturing apparatus; a first authentication information generating unit that generates first authentication information based on the first information and the second information acquired by the acquiring unit; and a usage authority determining unit that, when the first authentication information generated by the first authentication information generating unit and the first authentication information stored in advance in the license authentication device are not identical to each other, restricts use of the licensed function in the semiconductor manufacturing apparatus.

20 Claims, 10 Drawing Sheets

FIG. 12

| LICENSED FUNCTION | AUTHENTICATION STATE |
|---|---|
| DEVICE IDENTIFICATION CODE | ***** |
| LICENSED FUNCTION A | AUTHENTICATED |
| LICENSED FUNCTION B | AUTHENTICATED |
| LICENSED FUNCTION C | UNAUTHENTICATED |
| LICENSED FUNCTION D | UNAUTHENTICATED |

LICENSE AUTHENTICATION DEVICE AND LICENSE AUTHENTICATION METHOD

CROSS-REFERENCE TO RELATED APPLICATIONS

This application is based on and claims priority from Japanese Patent Application No. 2021-034277 filed on Mar. 4, 2021 with the Japan Patent Office, the disclosure of which is incorporated herein in its entirety by reference.

TECHNICAL FIELD

The present disclosure relates to a license authentication device, and a license authentication method.

BACKGROUND

A license authentication device capable of appropriately preventing an unauthorized use of an application that provides a function of a semiconductor manufacturing apparatus is known (see, e.g., Japanese Patent Laid-Open Publication NO. 2007-193579). Japanese Patent Laid-Open Publication No. 2007-193579 discloses a technology that restricts the execution of the function when the address information of the license information providing device that regularly sends license information on the network does not coincide with the address information stored in advance in the substrate processing apparatus.

SUMMARY

The present disclosure discloses a license authentication device for a semiconductor manufacturing apparatus that provides a licensed function that becomes available when authentication is completed, including: an acquiring unit that acquires first information and second information from the semiconductor manufacturing apparatus; a first authentication information generating unit that generates first authentication information based on the first information and the second information acquired by the acquiring unit; and a usage authority determining unit that, when the first authentication information generated by the first authentication information generating unit and the first authentication information stored in advance in the license authentication device are not identical to each other, restricts use of the licensed function in the semiconductor manufacturing apparatus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 12 illustrates an example of a view illustrating a correspondence between a licensed function held by a function license managing unit according to the present disclosure and an authentication state.

DETAILED DESCRIPTION

Figure 1:
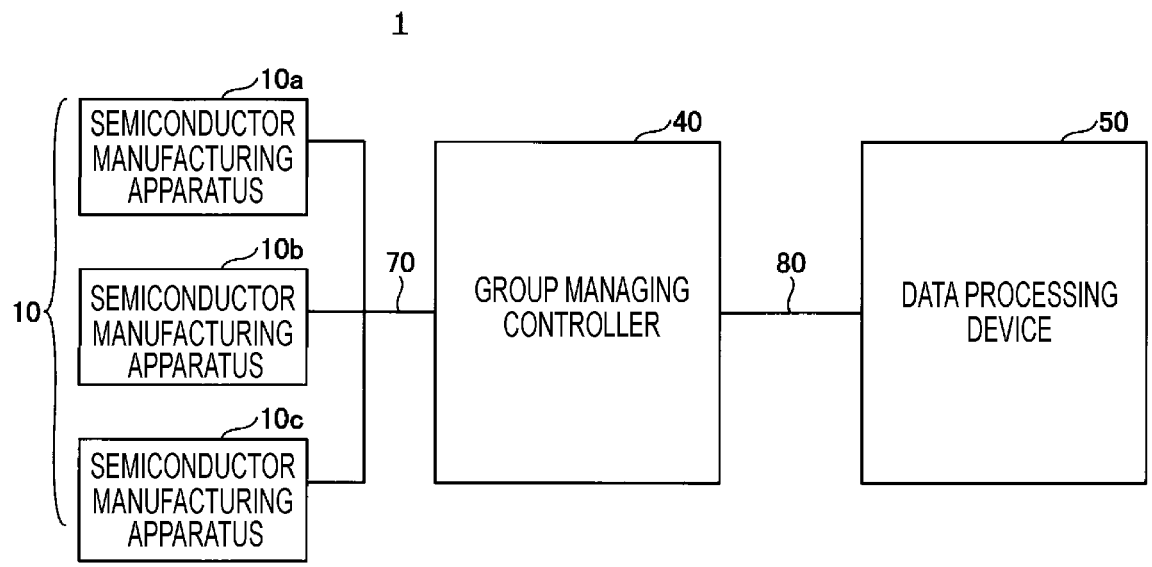
FIG. 1 is a view illustrating an example of an entire configuration of a system including a semiconductor manufacturing apparatus according to the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

Hereinafter, non-limiting exemplary embodiments of the present disclosure will be described with reference to the accompanying drawings. In all of the accompanying drawings, the same or corresponding members or parts are denoted by the same or corresponding reference numerals, and redundant explanations are omitted.

[Entire Configuration of System including Semiconductor Manufacturing Apparatus]

An entire configuration of a system including a semiconductor manufacturing apparatus will be described with reference to FIG. 1. FIG. 1 is a view illustrating an example of an entire configuration of a system 1 including a semiconductor manufacturing apparatus.

The system 1 includes semiconductor manufacturing apparatuses 10a, 10b, and 10c, a group managing controller 40, and a data processing device 50. The semiconductor manufacturing apparatuses 10a, 10b, and 10c are communicably connected to the group managing controller 40 via a communication line 70 of a semiconductor factory. The group managing controller 40 is communicably connected to the data processing device 50 via a communication line 80 of the semiconductor factory. The communication lines 70 and 80 are separated from, for example, an external network. However, the communication lines 70 and 80 may be communicably connected to the external network.

The semiconductor manufacturing apparatuses 10a, 10b, and 10c and the group managing controller 40, or the semiconductor manufacturing apparatuses 10a, 10b, and 10c are disposed in the semiconductor factory. The semiconductor factory is a so-called clean room, and workers wearing dust-proof clothing enter the semiconductor factory.

The semiconductor manufacturing apparatuses 10a, 10b, and 10c may be communicably connected to a host computer (not illustrated) via the communication line of the semiconductor factory. The host computer may be communicably connected to another device other than the semiconductor manufacturing apparatuses 10a, 10b, and 10c in the semiconductor factory, for example, an inspection device that inspects the semiconductor manufactured by the semiconductor manufacturing apparatuses 10a, 10b, and 10c, via the communication line of the semiconductor factory. The inspection device includes, for example, a film thickness measuring device, an electrical characteristic measuring device, and an optical characteristic measuring device.

In the following, any semiconductor manufacturing apparatus among the semiconductor manufacturing apparatuses 10a, 10b, and 10c will be referred to as a semiconductor manufacturing apparatus 10.

[Semiconductor Manufacturing Apparatus]

The semiconductor manufacturing apparatus 10 is an apparatus that performs various semiconductor manufacturing processes. The semiconductor manufacturing processes include various processings for manufacturing a semiconductor, such as, for example, a film forming processing, an etching processing, and a heat treatment. The semiconductor manufacturing apparatus 10 may be, for example, a cluster type apparatus in which a plurality of processing chambers is disposed around a transfer chamber, or an in-line type apparatus in which one processing chamber is disposed in one transfer chamber. Further, the semiconductor manufacturing apparatus 10 may be, for example, any of a single-wafer type apparatus, a semi-batch type apparatus, and a batch type apparatus. The single-wafer type apparatus is, for example, an apparatus that processes wafers one by one in the processing chamber. The semi-batch type apparatus is, for example, an apparatus in which a plurality of wafers disposed on the rotating table in the processing chamber is rotated by the rotating table, and sequentially passes a region to which a raw material is supplied and a region to which a reaction gas that reacts with the raw material gas is supplied to form a film on the surface of the wafer. The batch type apparatus is, for example, an apparatus that accommodates a wafer boat in which a plurality of wafers is horizontally held at predetermined intervals in the height direction in a processing chamber to process the plurality of wafers at once. Further, three semiconductor manufacturing apparatus 10 are illustrated in FIG. 1, but the number of the semiconductor manufacturing apparatuses 10 is not particularly limited. However, these apparatuses are examples, and for example, the semi-batch type or the batch type apparatus may be an apparatus in which a plurality of wafers is laterally disposed on a non-rotatable stage to perform a desired process.

[Group Managing Controller]

The group managing controller 40 acquires log data when the semiconductor manufacturing apparatus 10 performs a processing, and stores the acquired log data. Since at least date is recorded in the log data stored by the group managing controller 40, the data processing device 50 may determine the expiration of the license period based on the date of the log data. The configuration in FIG. 1 is an example, and the function of the group managing controller 40 may be held by the data processing device 50 or the semiconductor manufacturing apparatus 10.

[Data Processing Device]

The data processing device 50 is a license authentication device that functions as an application execution device executing an application of the semiconductor manufacturing apparatus 10, and authenticates a license of the application. The application implements a licensed function (to be described) of the semiconductor manufacturing apparatus 10, and the application corresponding to the licensed function is installed in advance. The number of the applications may be the same as the number of the licensed functions, or a plurality of licensed functions may be included in one application. However, the licensed function becomes available to a user (i.e., customer) when the license is authenticated.

[Hardware Configuration of Group Managing Controller]

Figure 2:
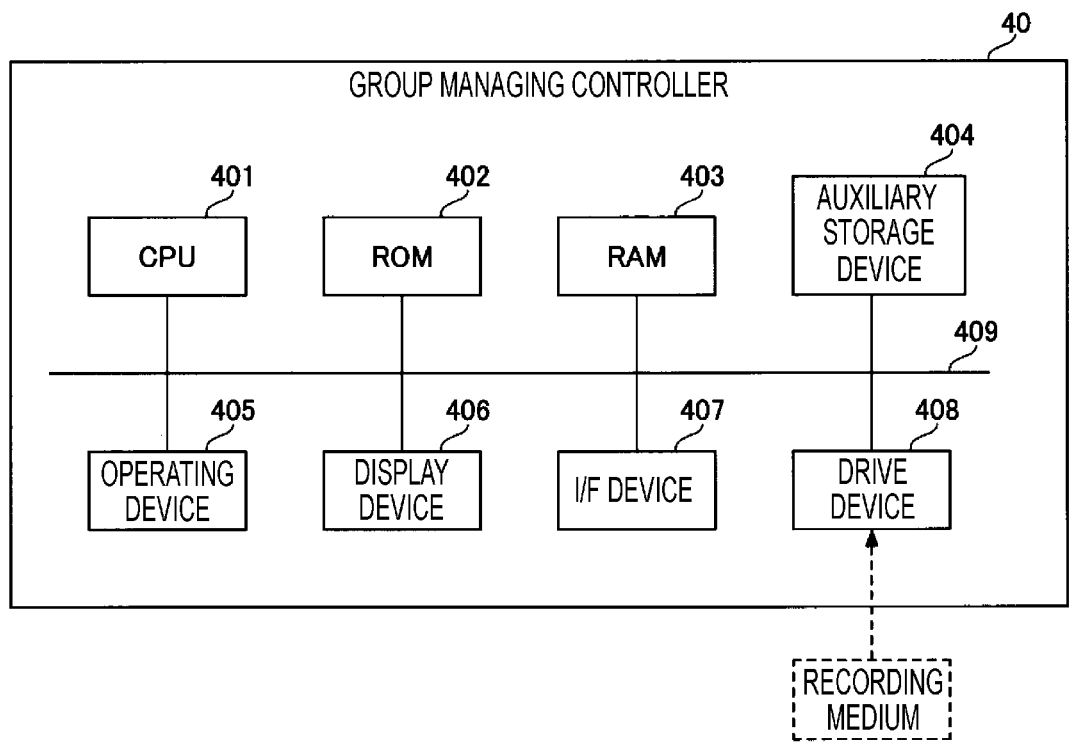
FIG. 2 is a view illustrating an example of a hardware configuration of a group managing controller according to the present disclosure.

A hardware configuration of the group managing controller 40 will be described with reference to FIG. 2. FIG. 2 is a view illustrating an example of the hardware configuration of the group managing controller 40.

The group managing controller 40 includes a central processing unit (CPU) 401, a read only memory (ROM) 402, and a random access memory (RAM) 403. The CPU 401, the ROM 402, and the RAM 403 constitute a so-called computer. Further, the group managing controller 40 includes an auxiliary storage device 404, an operating device 405, a display device 406, an interface (I/F) device 407, and a drive device 408. Respective hardwares of the group managing controller 40 are connected with each other via a bus 409.

The CPU 401 executes various programs installed in the auxiliary storage device 404.

The ROM 402 is a non-volatile memory, and functions as a main storage device. The ROM 402 stores, for example, various programs and data required for the CPU 401 to execute various programs installed in the auxiliary storage device 404.

The RAM 403 is a volatile memory such as a dynamic random access memory (DRAM) or a static random access memory (SRAM), and functions as a main storage device. The RAM 403 provides a working area developed when various programs installed in the auxiliary storage device 404 are executed by the CPU 401.

The auxiliary storage device 404 stores various programs, or log data of the semiconductor manufacturing apparatus 10 acquired by executing the various programs by the CPU 401.

The operating device 405 is an input device used when an administrator inputs various instructions to the group managing controller 40. The display device 406 is a display device that displays internal information of the group managing controller 40 and information acquired from the outside.

The I/F device 407 is a connection device that is connected to the communication lines 70 and 80 to communicate with the semiconductor manufacturing apparatus 10 or the data processing device 50.

The drive device 408 is a device configured to set a recording medium. The recording medium includes a medium that records information optically, electrically, or magnetically, such as, for example, a CD-ROM, a flexible disk, a magneto-optical disk. Further, examples of the recording medium may include a semiconductor memory that records information electrically, such as a ROM and a flash memory.

The various programs installed in the auxiliary storage device 404 are installed, for example, by setting the distributed recording medium in the drive device 408, and reading the various programs recorded in the recording medium by the drive device 408. Alternatively, the various programs installed in the auxiliary storage device 404 may be installed by downloading from a predetermined server.

[Hardware Configuration of Data Processing Device]

Figure 3:
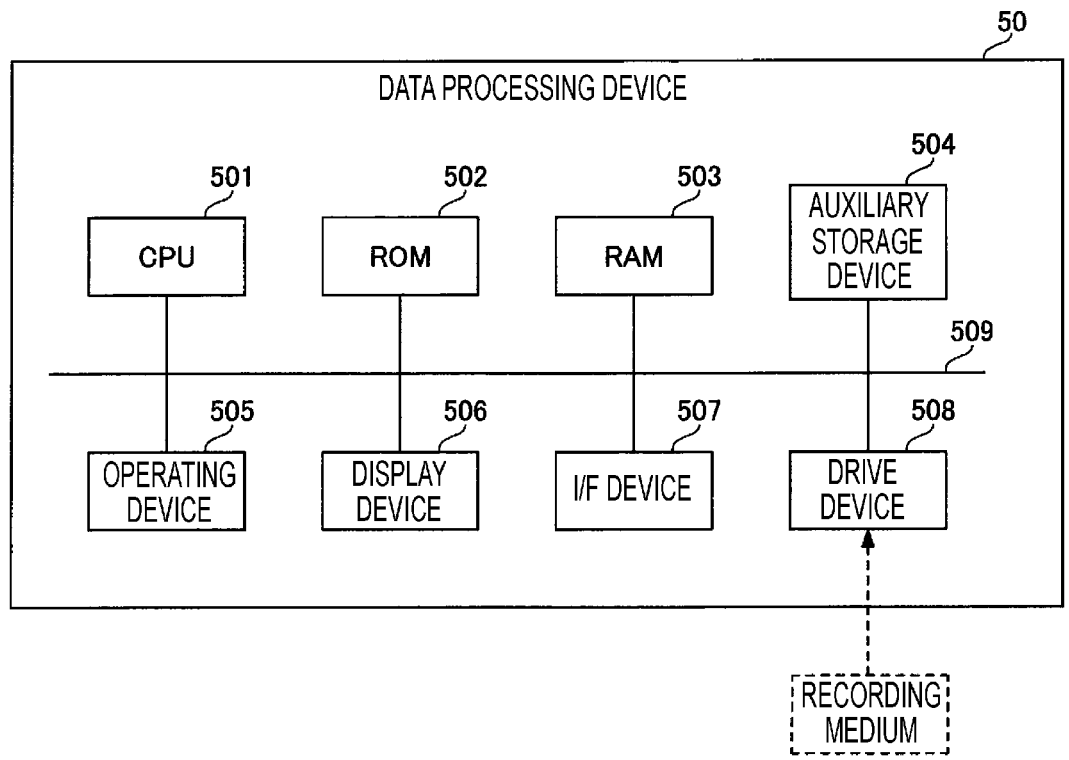
FIG. 3 is a view illustrating an example of a hardware configuration of a data processing device according to the present disclosure.

FIG. 3 is a view illustrating an example of a hardware configuration of the data processing device 50. The data processing device 50 includes a central processing unit (CPU) 501, a read only memory (ROM) 502, and a random access memory (RAM) 503. The CPU 501, the ROM 502, and the RAM 503 constitute a so-called computer. Further, the data processing device 50 includes an auxiliary storage device 504, an operating device 505, a display device 506, an interface (I/F) device 507, and a drive device 508. Respective hardwares of the data processing device 50 are connected with each other via a bus 509.

The CPU 501 executes various programs installed in the auxiliary storage device 504.

The ROM 502 is a non-volatile memory, and functions as a main storage device. The ROM 502 stores, for example, various programs and data required for the CPU 501 to execute various programs installed in the auxiliary storage device 504.

The RAM 503 is a volatile memory such as a dynamic random access memory (DRAM) or a static random access memory (SRAM), and functions as a main storage device. The RAM 503 provides a working area developed when various programs installed in the auxiliary storage device 504 are executed by the CPU 501.

The auxiliary storage device 504 is a non-volatile large-capacity storage device that stores various programs. The auxiliary storage device 504 may be a non-volatile large-capacity storage medium such as a hard disk drive (HDD) or a solid state drive (SSD).

Various programs include the application that implements the licensed function of the semiconductor manufacturing apparatus 10. Further, the auxiliary storage device 504 stores a license file of the application. The license file contains information such as a device identification code and whether or not the licensed function is authenticated. The license file may further contain, for example, license expiration date, license PC information, and license device information. The license expiration date is a valid date of the license. The license PC information is information on a computer in which the licensed application should be used. The license device information is information on the semiconductor manufacturing apparatus 10 in which the licensed application should be used.

The operating device 505 is an input device used when an administrator inputs various instructions to the data processing device 50. The display device 506 is a display device that displays internal information of the data processing device 50 and information acquired from the outside.

The I/F device 507 is a connection device that is connected to the communication line 80 to communicate with the group managing controller 40.

The drive device 508 is a device configured to set a recording medium. The recording medium includes a medium that records information optically, electrically, or magnetically, such as, for example, a CD-ROM, a flexible disk, a magneto-optical disk. Further, examples of the recording medium may include a semiconductor memory that records information electrically, such as a ROM and a flash memory.

The various programs installed in the auxiliary storage device 504 are installed, for example, by setting the distributed recording medium in the drive device 508, and reading the various programs recorded in the recording medium by the drive device 508. Alternatively, the various programs installed in the auxiliary storage device 504 may be installed by downloading from a predetermined server.

[Outline of Prevention of Unauthorized Use of Licensed Function]

The data processing device 50 according to the present disclosure suppresses unauthorized use of the licensed function by two-stages authentication. The licensed function is a function that becomes valid when contractual conditions between a licensor and a licensee are satisfied, such as payment of price. However, for a certain period at the beginning of the introduction of the semiconductor manufacturing apparatus 10, a customer may try the licensed function free of charge as long as the contractual conditions are satisfied.

First, the data processing device 50 performs hardware authentication of the semiconductor manufacturing apparatus 10 as first-stage authentication.

Hardware Authentication

The hardware authentication refers to authentication whether or not the combination of the auxiliary storage device 504 mounted on the data processing device 50 and the semiconductor manufacturing apparatus 10 is correct. Specifically, when the semiconductor manufacturing apparatus 10 is started, the data processing device 50 determines whether or not the auxiliary storage device 504 mounted on the data processing device 50 is associated with the semiconductor manufacturing apparatus 10, based on the "device identification code." Since the device identification code is stored in the auxiliary storage device 504 at the time of shipment from the factory (occasionally after shipment), the data processing device 50 determines whether or not the generate identification code coincides with the device identification code stored in the auxiliary storage device 504.

In the present disclosure, the "shipment from the factory" refers to the shipment from the factory of the manufacturer of the semiconductor manufacturing apparatus 10 to a customer.

When the combination of the auxiliary storage device 504 mounted on the data processing device 50 and the semiconductor manufacturing apparatus 10 is not correct, the data processing device 50 disables all licensed functions, and outputs an alarm.

The data processing device 50 performs license authentication as second-stage authentication.

License Authentication

The license authentication refers to authentication whether or not a license key input to authenticate the licensed function is correct. In order for a customer to use the licensed function, it is necessary to input a "license key" different for each licensed function. The license authentication determines whether or not the input license key and the license key generated by the data processing device 50 coincide with each other.

Figure 4:
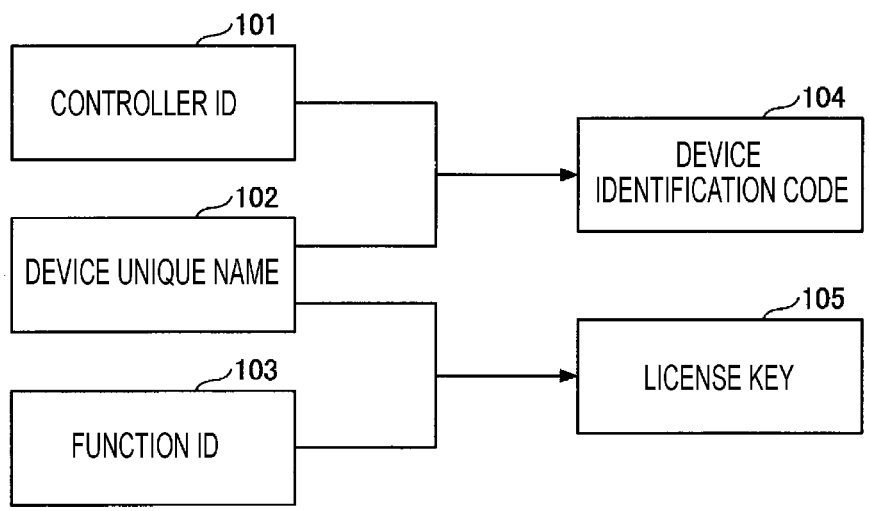
FIG. 4 illustrates an example of a view illustrating generation of a device identification code and a license key according to the present disclosure.

FIG. 4 is a view illustrating generation of a device identification code 104 and a license key 105. As illustrated in FIG. 4, the device identification code 104 (an example of first authentication information) is created from a device unique name 102 and a controller ID 101. The license key 105 (an example of second authentication information) is created from the device unique name 102 and a function ID 103.

The device unique name 102 is a name different for each semiconductor manufacturing apparatus 10, such as, for example, a serial number (an example of second information). The device unique name 102 is stored, for example, in the ROM 502 on a substrate of the semiconductor manufacturing apparatus 10. It is difficult to rewrite the device unique name 102.

The controller ID 101 is an ID different for each semiconductor manufacturing apparatus 10, and is, for example, a media access control (MAC) address (an example of first information) provided in a control board (to be described later). The MAC address is a mark used to identify a network interface. The MAC address is unique to the semiconductor manufacturing apparatus 10 since the MAC address is difficult to be rewritten and has uniqueness.

The function ID 103 is different for each licensed function, and is identification information to identify the licensed function.

As described above, since the device identification code 104 is device-unique information, when the customer changes the combination of the auxiliary storage device 504 and the semiconductor manufacturing apparatus 10, due to the first-stage authentication, the data processing device 50 may restrict the use of the licensed function. For example, it is possible to suppress the unauthorized use mode in which the auxiliary storage device 504 in which the licensed function is valid is used in another semiconductor manufacturing apparatus 10.

Further, since the license key 105 is also unable to be generated without the device-unique information, the license key 105 that makes the licensed function available to the customer is different for each semiconductor manufacturing apparatus 10. For example, even when the customer knows the license key 105 of the licensed function for another semiconductor manufacturing apparatus 10, due to the second-stage authentication, the license key 105 is unable to be diverted to the other semiconductor manufacturing apparatus 10.

As described above, due to the two-stages authentication, the data processing device 50 may more strongly suppress the unauthorized use of the licensed function.

Supplementarily, although the device unique name is always different for each semiconductor manufacturing apparatus 10, the device unique name may be changed by the customer from the screen of the data processing device 50. As a result, the license key may not be always different for each semiconductor manufacturing apparatus 10.

Meanwhile, the controller ID is device unique information that is unable to be changed by anyone. When the license key is created using the controller ID instead of the device unique name, the two-stages authentication is not necessary (hardware authentication becomes unnecessary). However, in order to confirm the controller ID, it is required for a service engineer to enter the semiconductor factory, and it takes time and there is a restriction. If it takes time for making the function valid at every time, it hinders the work. Therefore, the license key becomes possible to be created with information (device unique name) that is easy to grasp for the service engineer.

Further, as illustrated in FIG. 4, creating the device identification code and the license key from a common device unique name is a countermeasure against diverting the license key by changing the device unique name.

Further, from the configuration in FIG. 4, when the controller ID 101 and the device unique name 102 are identical, it is one semiconductor manufacturing apparatus 10. Therefore, regardless of whether the device is a cluster type apparatus, an in-line type apparatus, a single-wafer type apparatus, a semi-batch type apparatus, or a batch type apparatus, the two-stages authentication is performed for the semiconductor manufacturing apparatus 10 in which the controller ID 101 and the device unique name 102 are common.

[With Respect to Function of Data Processing Device]

Figure 5:
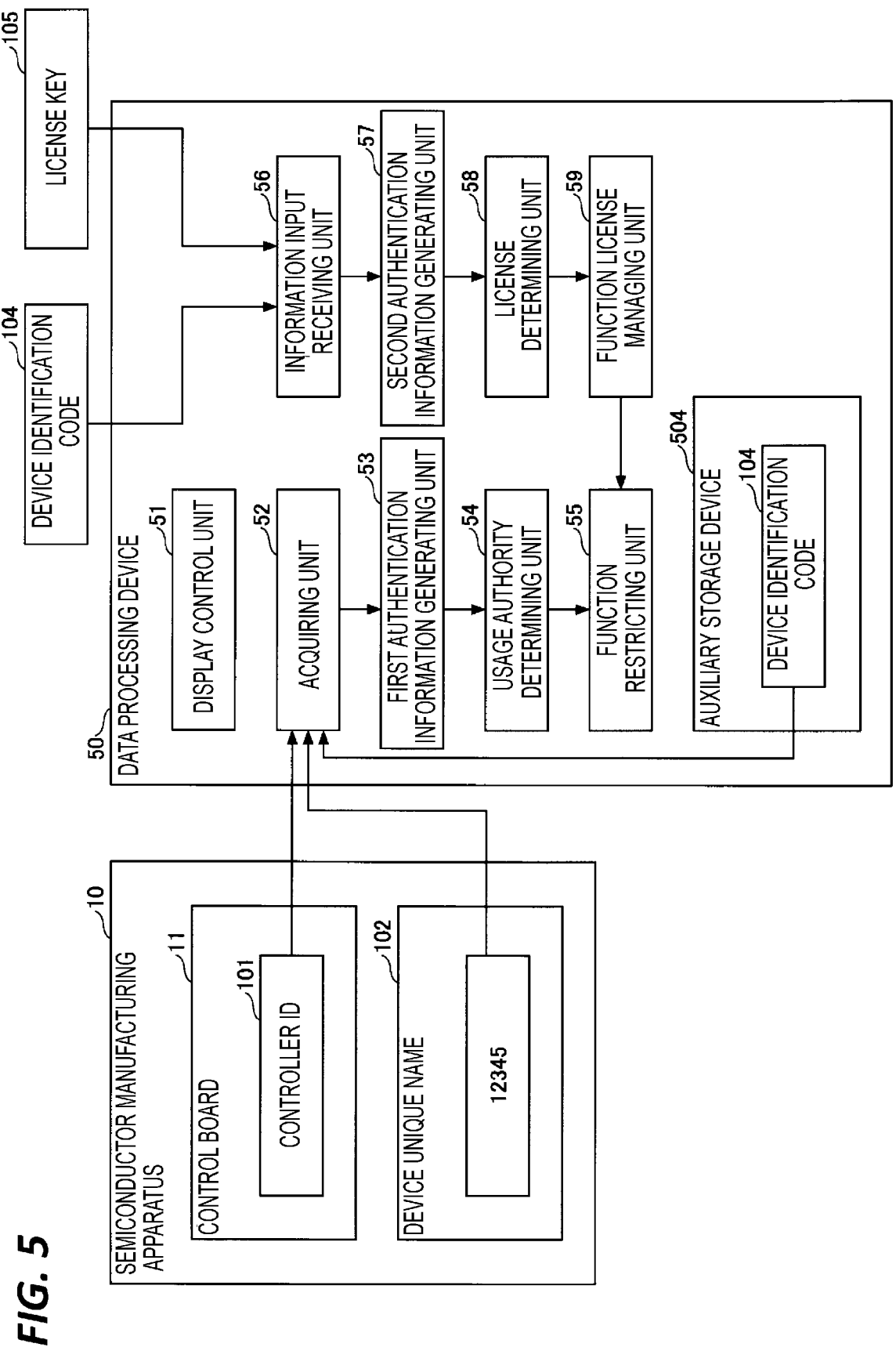
FIG. 5 illustrates an example of a functional block diagram illustrating information included in a semiconductor manufacturing apparatus and functional configurations provided in the data processing device according to the present disclosure by dividing them into blocks.

Subsequently, information included in the semiconductor manufacturing apparatus 10 and functional configurations provided in the data processing device 50 will be described with reference to FIG. 5. FIG. 5 illustrates an example of a functional block diagram illustrating information included in the semiconductor manufacturing apparatus 10 and the functional configurations provided in the data processing device 50 by dividing them into blocks.

First, the semiconductor manufacturing apparatus 10 is provided with a control board 11. The control board 11 controls a heater power supply, a flow rate of a gas, a radio-frequency power supply, and an exhaust device of the semiconductor manufacturing apparatus 10 according to a control signal from a module controller (MC) (not illustrated). The control board 11 is provided with a network card (LAN card) for communication with the group managing controller 40 or the data processing device 50.

Since the uniqueness of the MAC address of the network card is guaranteed, the MAC address held by the network card may be adopted as the controller ID 101 in FIG. 4. The MAC address is stored in, for example, the ROM (an example of storage unit) of the network card.

Further, the semiconductor manufacturing apparatus 10 stores the device unique name 102 in a non-volatile memory (an example of storage unit) such as the ROM 502. The device unique name 102 is also stored at the time of shipment from the factory. The device unique name 102 may be, for example, a serial number.

Subsequently, the data processing device 50 is provided with the auxiliary storage device 504. The auxiliary storage device 504 stores a program for sending a control signal to the control board 11 or an application corresponding to the licensed function. However, in order for a user to use the licensed function, it is necessary to authenticate the licensed function.

The auxiliary storage device 504 stores the device identification code 104 stored at the time of shipment from the factory (or may be after shipment from the factory). Therefore, the correspondence between the auxiliary storage device 504 and the semiconductor manufacturing apparatus 10 is fixed.

Further, the data processing device 50 is provided with a display control unit 51, an acquiring unit 52, a first authentication information generating unit 53, a usage authority determining unit 54, a function restricting unit 55, an information input receiving unit 56, a second authentication information generating unit 57, a license determining unit 58, and a function license managing unit 59.

The display control unit 51 displays a setting screen serving as a user interface on the display device 506 of the data processing device 50. Further, when some trouble occurs, the display control unit 51 displays an alarm.

The acquiring unit 52 acquires the controller ID 101 and the device unique name 102 from the semiconductor manufacturing apparatus 10 and the device identification code 104 from the auxiliary storage device 504 for the first-stage and the second-stage authentication.

The first authentication information generating unit 53 applies a predetermined algorithm to the controller ID 101 and the device unique name 102 to generate the device identification code 104. When a hash function is used as a part of the algorithm, it becomes difficult to reverse-generate the controller ID 101 and the device unique name 102 from the device identification code 104.

The usage authority determining unit 54 determines whether or not the device identification code 104 acquired from the semiconductor manufacturing apparatus 10 and the device identification code 104 generated by the first authentication information generating unit 53, and notifies the function restricting unit 55 of the determination result (corresponding to hardware authentication).

The function restricting unit 55 permits the use of the licensed function when the two device identification codes 104 coincide with each other. The function restricting unit 55 restricts the use of the licensed function when the two device identification codes 104 do not coincide with each other. "Restriction" includes prohibiting the use of all licensed functions, prohibiting the use of some of all licensed functions, or prohibiting some functions of some licensed function.

The information input receiving unit 56 receives, for example, input of information from a service engineer. For example, the information input receiving unit 56 may receive input of the device identification code 104 for recovery when the auxiliary storage device 504 or the control board 11 fails, and input of the license key 105 for license authentication.

The second authentication information generating unit 57 acquires the function ID 103 from the input license key 105. The second authentication information generating unit 57 applies a predetermined algorithm to the function ID 103 and the device unique name 102 to generate the license key 105. When a hash function is used as a part of the algorithm, it becomes difficult to reverse-generate the function ID 103 and the device unique name 102 from the license key 105.

The license determining unit 58 determines whether or not the input license key 105 is correct (corresponding to license authentication) based on whether or not the input license key 105 and the generated license key 105 coincide with each other. When the input license key 105 is correct, the license determining unit 58 notifies the function license managing unit 59 that authentication has been completed by the function ID 103.

The function license managing unit 59 manages whether or not the licensed function has been authenticated in the license file for each licensed function (see FIG. 12). The customer is able to use the authenticated licensed function in the semiconductor manufacturing apparatus 10.

In FIG. 5, the data processing device 50 has the functions of hardware authentication and license authentication, but the semiconductor manufacturing apparatus 10 may have these functions. Further, semiconductor manufacturing apparatus 10 may be provided with the auxiliary storage device 504.

[Setting Sequence of Device Identification Code]

The device identification code 104 may be set in the semiconductor manufacturing apparatus 10 by a person in charge at the time of shipment from the factory. However, descriptions will be made on another phase in which the device identification code 104 is set in the semiconductor manufacturing apparatus 10 after shipment from the factory. First, a trial period may be set for the licensed function of the semiconductor manufacturing apparatus 10. A customer may use the licensed function during the trial period without paying the price of the licensed function. In this case, since the device identification code 104 is also unnecessary, the device identification code 104 is not set in the semiconductor manufacturing apparatus 10. Therefore, when the customer wants to use the licensed function after the trial period is elapsed, the service engineer or the like may set the device identification code 104 in the customer's auxiliary storage device 504 after shipment from the factory.

Figure 6:
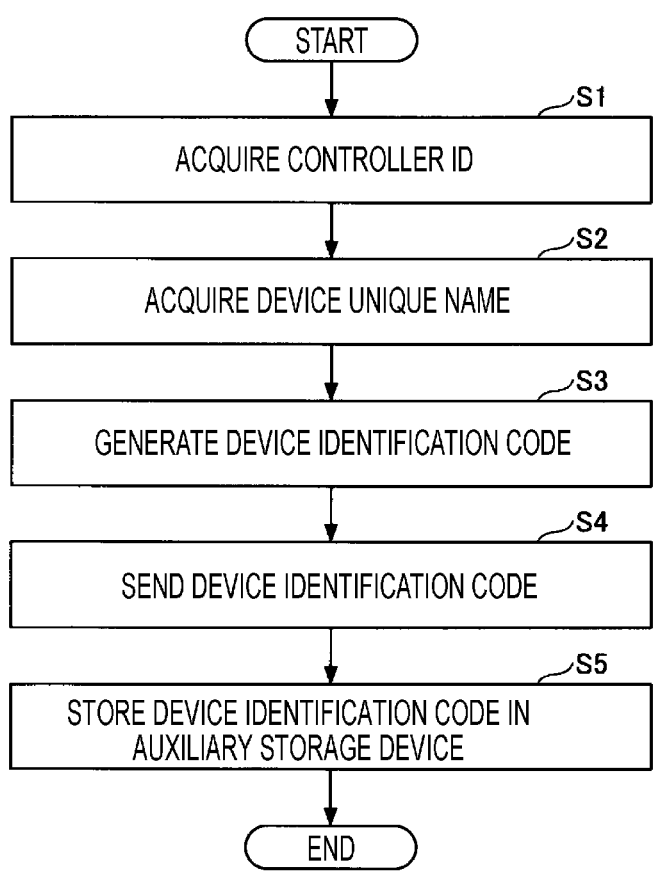
FIG. 6 illustrates an example of a flowchart illustrating a flow of setting a device identification code in an auxiliary storage device according to the present disclosure.

FIG. 6 illustrates an example of a flowchart illustrating a flow of setting the device identification code 104 in the auxiliary storage device 504 after shipment from the factory.

When a request from the customer is received, the service engineer acquires the controller ID 101 from the semiconductor manufacturing apparatus 10 installed in the semiconductor factory of the customer (step S1). The service engineer may enter the semiconductor factory to acquire the controller ID 101, or operate the data processing device 50 to acquire the controller ID 101.

Further, the service engineer acquires the device unique name 102 from the semiconductor manufacturing apparatus 10 (step S2). Since the device unique name 102 is disclosed in a contract of the semiconductor manufacturing apparatus 10, or may be read by the data processing device 50, the device unique name 102 may be obtained in any way.

Subsequently, the service engineer sends the controller ID 101 and the device unique name 102 to the factory of the manufacturer of the semiconductor manufacturing apparatus 10 by, for example, e-mail or a dedicated line. When using e-mail, the service engineer may encrypt the controller ID 101 and the device unique name 102.

The factory of the manufacturer of the semiconductor manufacturing apparatus 10 generates the device identification code 104 from the controller ID 101 and the device unique name 102 using a predetermined algorithm used by the first authentication information generating unit 53 (step S3).

Subsequently, the person in charge of the factory of the manufacturer of the semiconductor manufacturing apparatus 10 sends the device identification code 104 to the service engineer by, for example, e-mail or a dedicated line (step S4). When using e-mail, the person in charge may encrypt the device identification code 104. The person in charge of the factory of the manufacturer of the semiconductor manufacturing apparatus 10 may directly send the device identification code 104 to the customer.

The service engineer stores the device identification code 104 in the auxiliary storage device 504 (step S5). The service engineer stores the device identification code 104 in the auxiliary storage device 504 by, for example, inputting the device identification code 104 from the data processing device 50.

Figure 7:
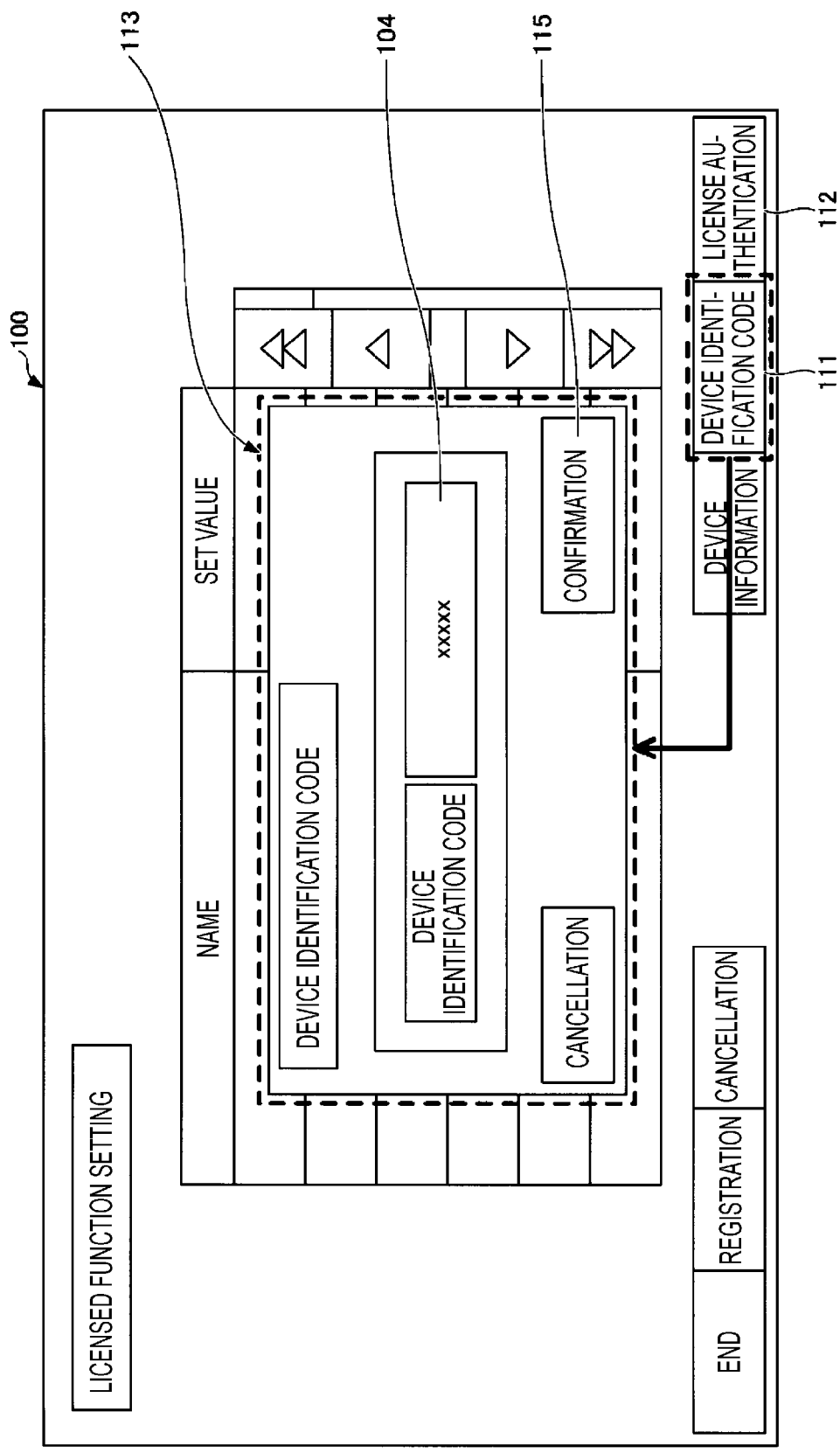
FIG. 7 is a view illustrating an example of a setting screen of a licensed function that is displayed on the data processing device according to the present disclosure.

FIG. 7 illustrates a setting screen 100 of the licensed function that is displayed on the data processing device 50 as an example. The setting screen 100 of the licensed function includes a device identification code button 111 and a license authentication button 112. The device identification code button 111 is a button for displaying a device identification code input dialog 113. The license authentication button 112 is a button for displaying a license key input dialog 116. As illustrated in FIG. 7, the service engineer inputs the device identification code 104 sent from the factory to the device identification code input dialog 113, and presses a confirmation button 115. As a result, the device identification code 104 is stored in the auxiliary storage device 504 of the data processing device 50. As described above, the service engineer may set the device identification code 104 from the setting screen 100 of the licensed function after the semiconductor manufacturing apparatus 10 is shipped from the factory.

When the device identification code 104 is stored in the auxiliary storage device 504, the license authentication button 112 on the setting screen 100 of the licensed function becomes valid (pressable). Desirably, the license authentication button 112 should be valid after the data processing device 50 performs the same authentication as the first-stage authentication described in FIG. 8, and the combination of the auxiliary storage device 504 mounted on the data processing device 50 and the semiconductor manufacturing apparatus 10 is authenticated to be correct. Since FIG. 7 illustrates a state before the device identification code 104 is stored in the auxiliary storage device 504, the license authentication button 112 is displayed with, for example, half-luminance.

At the time of shipment from the factory, it is not necessary for the person in charge of the factory of the manufacturer of the semiconductor manufacturing apparatus 10 to input the device identification code 104. At the time of shipment from the factory, the person in charge of the factory presses a predetermined button, and thus, a dedicated software generates the device identification code 104 from the controller ID 101 and the device unique name 102 and stores the device identification code 104 in the auxiliary storage device 504.

[Hardware Authentication (First-Stage Authentication)]

Subsequently, the hardware authentication, which is the first-stage authentication, will be described with reference to FIG. 8.

Figure 8:
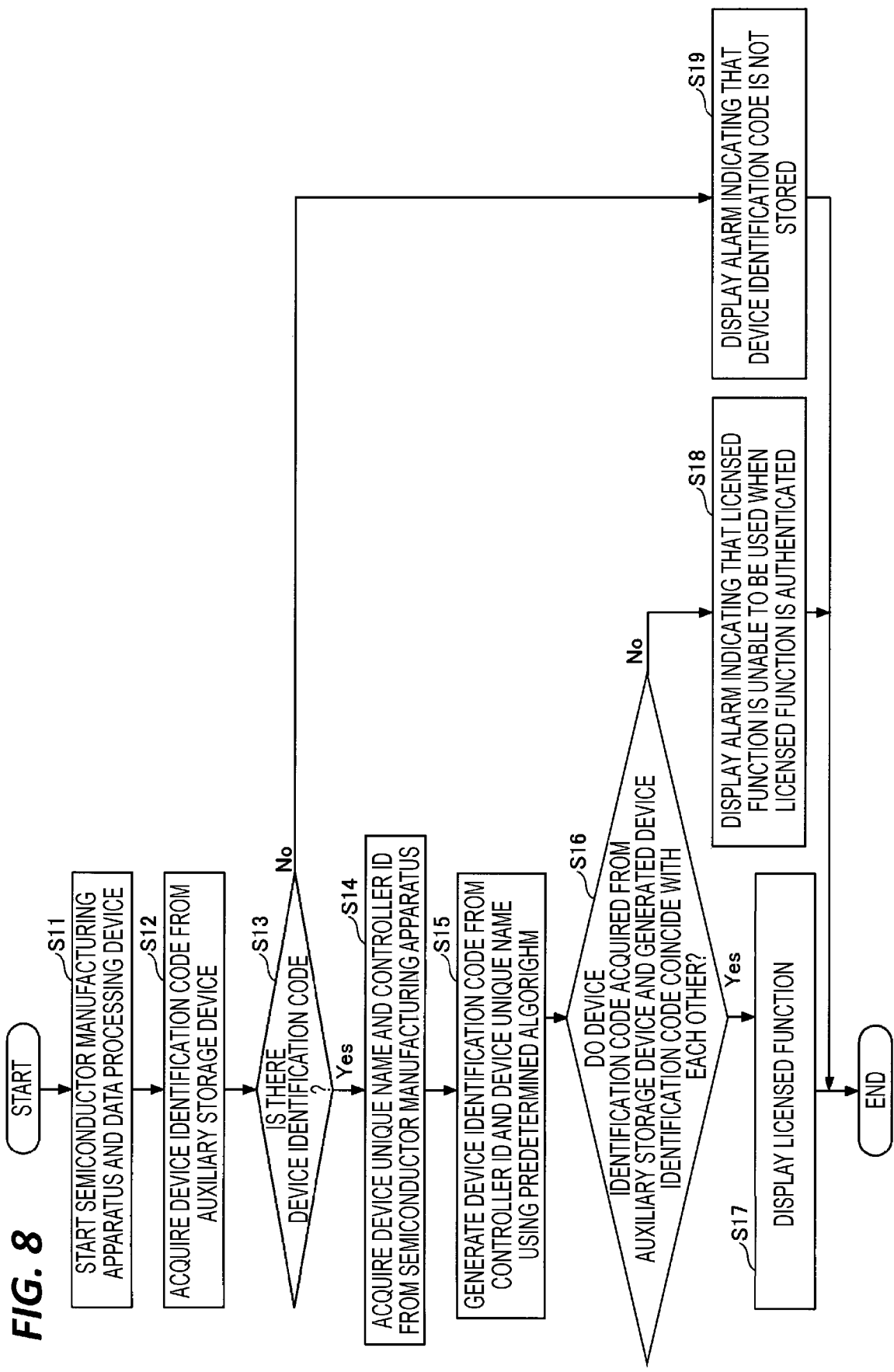
FIG. 8 illustrates an example of a flowchart illustrating a sequence for hardware authentication by the data processing device according to the present disclosure.

FIG. 8 illustrates an example of a flowchart illustrating a sequence for the hardware authentication by the data processing device 50.

First, the semiconductor manufacturing apparatus 10 and the data processing device 50 are started (step S11). Only the data processing device 50 may be started. "Start" may refer to the turn-on of the power supply, or the start of an OS or an application installed in the auxiliary storage device 504.

When the start is completed, the acquiring unit 52 acquires the device identification code 104 from the auxiliary storage device 504 (step S12). The device identification code 104 is stored in, for example, the license file, but the stored location does not matter.

The acquiring unit 52 determines whether or not the device identification code 104 may be acquired (step S13). The acquiring unit 52 may refer to, for example, a flag indicating whether or not the device identification code 104 is stored, or a fixed location (license file or address) of the auxiliary storage device 504 in which the device identification code 104 should be stored. In the latter case, the acquiring unit 52 determines that the acquisition is not possible when the value at the fixed location is NULL or zero.

When the device identification code 104 is unable to be acquired (No in step S13), the display control unit 51 displays an alarm indicating that the device identification code 104 is not stored (step S19). For example, the following alarm is displayed as an example.

"Device Identification Code Not Set
The device identification code is not set.
Please contact our service engineer.
The alarm will be automatically deleted when the setting is completed."

Originally, the device identification code 104 is stored in the auxiliary storage device 504 at the time of shipment from the factory. However, there may be a case where the device identification code 104 is not stored in the auxiliary storage device 504 for, for example, a trial period of the licensed function. When the device identification code 104 is not stored, since it may be a trial period, the alarm will be displayed, but the customer is able to use the licensed function.

When the device identification code 104 is able to be acquired (Yes in step S13), the acquiring unit 52 acquires the device unique name 102 and the controller ID 101 from the semiconductor manufacturing apparatus 10 (step S14). The device unique name 102 is acquired from the ROM 502 of the semiconductor manufacturing apparatus 10 separated from the auxiliary storage device 504, and the controller ID 101 is acquired from the control board 11 of the semiconductor manufacturing apparatus 10 separated from the auxiliary storage device 504.

Subsequently, the first authentication information generating unit 53 generates the device identification code 104 from the controller ID 101 and the device unique name 102 using a predetermined algorithm (step S15).

Then, the usage authority determining unit 54 determines whether or not the device identification code 104 acquired from the auxiliary storage device 504 and the generated device identification code 104 coincide with each other (step S16).

When the device identification code 104 acquired from the auxiliary storage device 504 and the generated device identification code 104 coincide with each other (Yes in step S16), the customer is able to use the licensed function (step S17). For example, the display control unit 51 displays the authenticated licensed function so that the customer is able to select the licensed function.

When the device identification code 104 acquired from the auxiliary storage device 504 and the generated device identification code 104 do not coincide with each other (No in step S16), when the licensed function is authenticated, the display control unit 51 displays an alarm indicating that the licensed function is unable to be used (step S18). For example, the following alarm is displayed as an example.

"Licensed Function Cannot Be Used
The licensed function can no longer be used.
Please contact the factory for restoration.
After restoration, the alarm message can be deleted by deleting the display."

In this case, since the display control unit 51 does not display the licensed function on the setting screen 100 of the licensed function, the customer is unable to select the licensed function. The reason for limiting the case where the licensed function is authenticated is that the hardware authentication is intended to suppress the unauthorized use of the licensed function at the beginning. Further, whether or not the licensed function is authenticated is determined by whether or not the authenticated licensed function is registered in the function license managing unit 59 (license file).

Since the device identification code 104 is generated using information unique to the semiconductor manufacturing apparatus 10, when the device identification code 104 stored in the auxiliary storage device 504 and the generated device identification code 104 are different from each other, it may be determined that the auxiliary storage device 504 of the data processing device 50, which has been used in combination with another semiconductor manufacturing apparatus 10 is mounted on the data processing device 50. In this case, the data processing device 50 restricts the use of the licensed function. Therefore, the unauthorized use of the licensed function of mounting the auxiliary storage device 504 (licensed function is authenticated) of the data processing device 50 used in combination with another semiconductor manufacturing apparatus 10 on the data processing device 50 may be suppressed.

[Making Licensed Function Valid by Inputting License Key]

The licensed function may be valid at the time of shipment from the factory, or may be valid by a service engineer after the shipment from the factory. After the shipment from the factory, the customer purchases licenses at any time if there are licensed functions that the customer wants to use. As a result, the customer only has to pay the price for the function to be used, so that the cost may be reduced.

Figure 9:
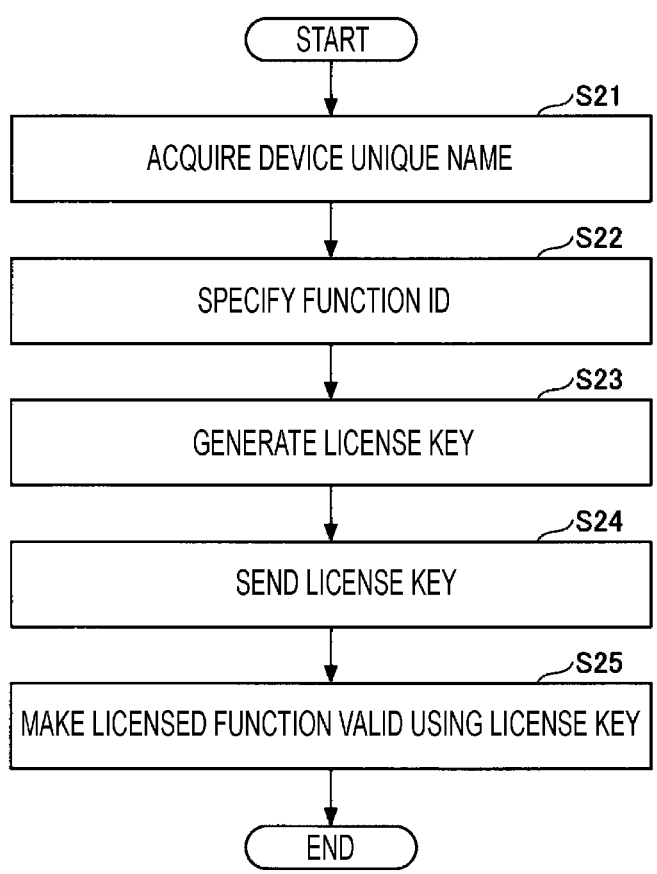
FIG. 9 illustrates an example of a flowchart illustrating a flow of setting a license key in the data processing device according to the present disclosure.

FIG. 9 illustrates an example of a flowchart illustrating a flow of setting the license key 105 in the data processing device 50.

When a request from the customer is received, the service engineer acquires the device unique name 102 from the semiconductor manufacturing apparatus 10 (step S21). Since the device unique name 102 is disclosed in a contract of the semiconductor manufacturing apparatus 10, or may be read by the data processing device 50, the device unique name 102 may be obtained in any way.

Subsequently, the service engineer specifies the function ID 103 by confirming the licensed function purchased by the customer (step S22). The function ID 103 is uniquely determined according to the licensed function. As a result, the service engineer may specify the function ID 103, or the name of the licensed function may be acquired.

Subsequently, the service engineer sends the device unique name 102 and the function ID 103 (or name of the licensed function) to the factory of the manufacturer of the semiconductor manufacturing apparatus 10 by, for example, e-mail or a dedicated line. When using e-mail, the service engineer may encrypt the device unique name 102 and the function ID 103.

The factory of the manufacturer of the semiconductor manufacturing apparatus 10 generates the license key 105 from the device unique name 102 and the function ID 103 using a predetermined algorithm used by the second authentication information generating unit 57 (step S23).

Subsequently, the person in charge of the factory of the manufacturer of the semiconductor manufacturing apparatus 10 sends the license key 105 to the service engineer by, for example, e-mail or a dedicated line (step S24). When using e-mail, the person in charge of the factory may encrypt the license key 105. The person in charge of the factory may directly send the license key 105 to the customer.

The service engineer makes the licensed function valid by inputting the license key 105 to the data processing device 50 (step S25).

Figure 10A:
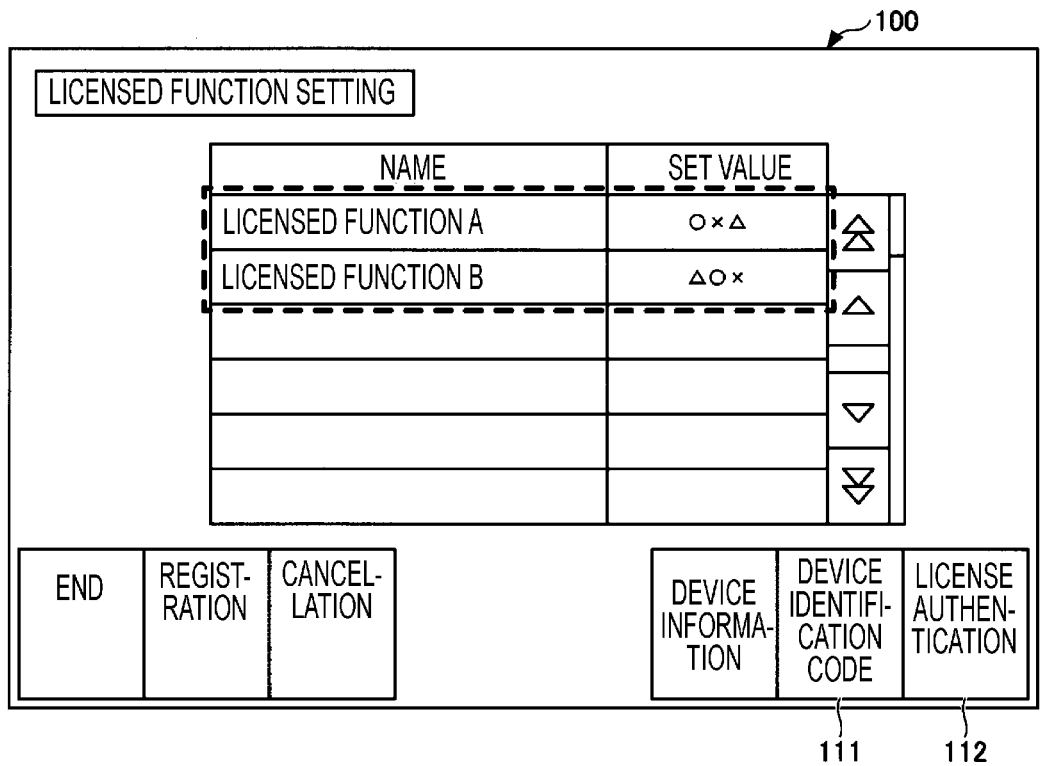
FIGS. 10A and 10B are views illustrating an example of a setting screen of a licensed function that is displayed on the data processing device according to the present disclosure.
Figure 10B:
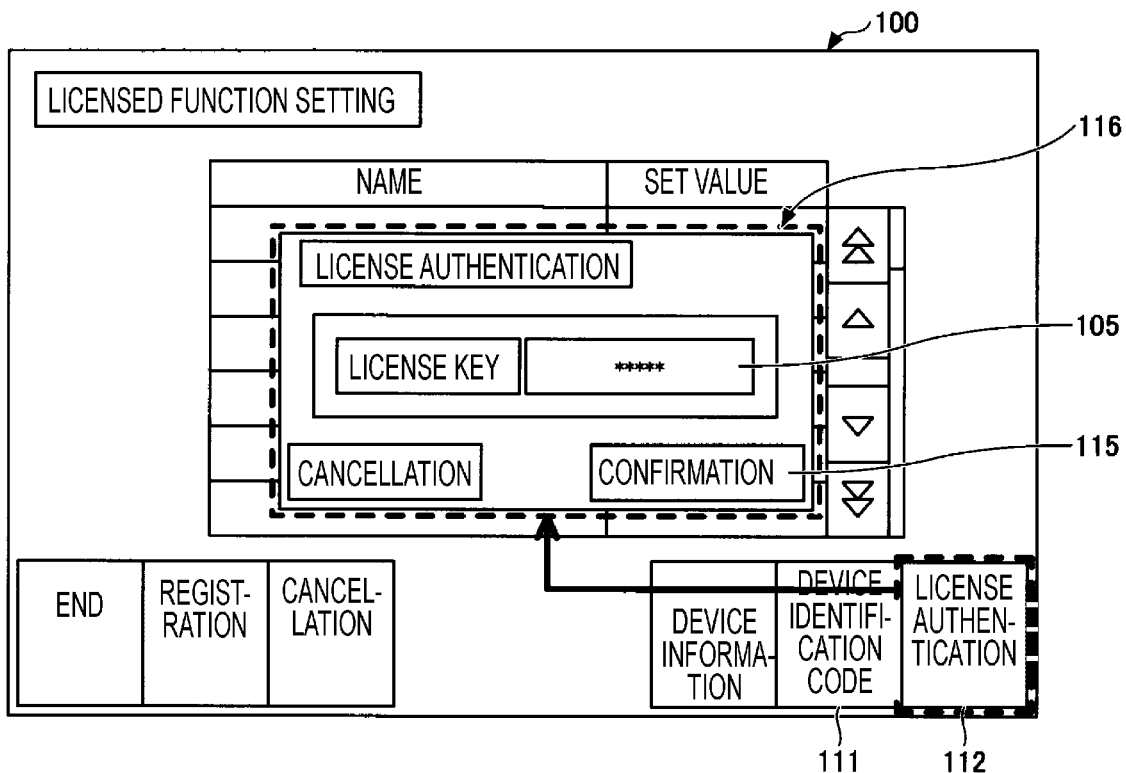

FIGS. 10A and 10B illustrate the setting screen 100 of the licensed function that is displayed on the data processing device 50 as an example. FIG. 10A and FIG. 7 illustrate the setting screen 100 of the same licensed function, but FIG. 10A illustrates a phase in which a service engineer inputs the license key 105. Further, in FIGS. 10A and 10B, two licensed functions A and B are authenticated in advance.

Hereinafter, the licensed function will be described. Specifically, the manufacturer of the semiconductor manufacturing apparatus 10 may determine what kind of function is to be determined as the licensed function in consideration of the content of the function. For example, an advanced function, a function that is not necessary for all customers, or a special function is a licensed function. As an example, there may be the following licensed functions.

Function that automatically recognizes a process recipe

Temperature correction function according to a cumulative film thickness

Change resolution of set temperature or display temperature (0.1° C. to 0.01° C.)

In FIG. 10A, it is assumed that the two licensed functions A and B are authenticated. When the service engineer tries to make a third licensed function valid, the service engineer presses the license authentication button 112.

FIG. 10B illustrates an example of the license key input dialog 116 displayed by pressing the license authentication button 112. As illustrated in FIG. 10B, the service engineer inputs the license key 105 sent from the factory to the license key input dialog 116, and presses the confirmation button 115. The data processing device 50 starts the authentication of the license key 105.

Figure 11:
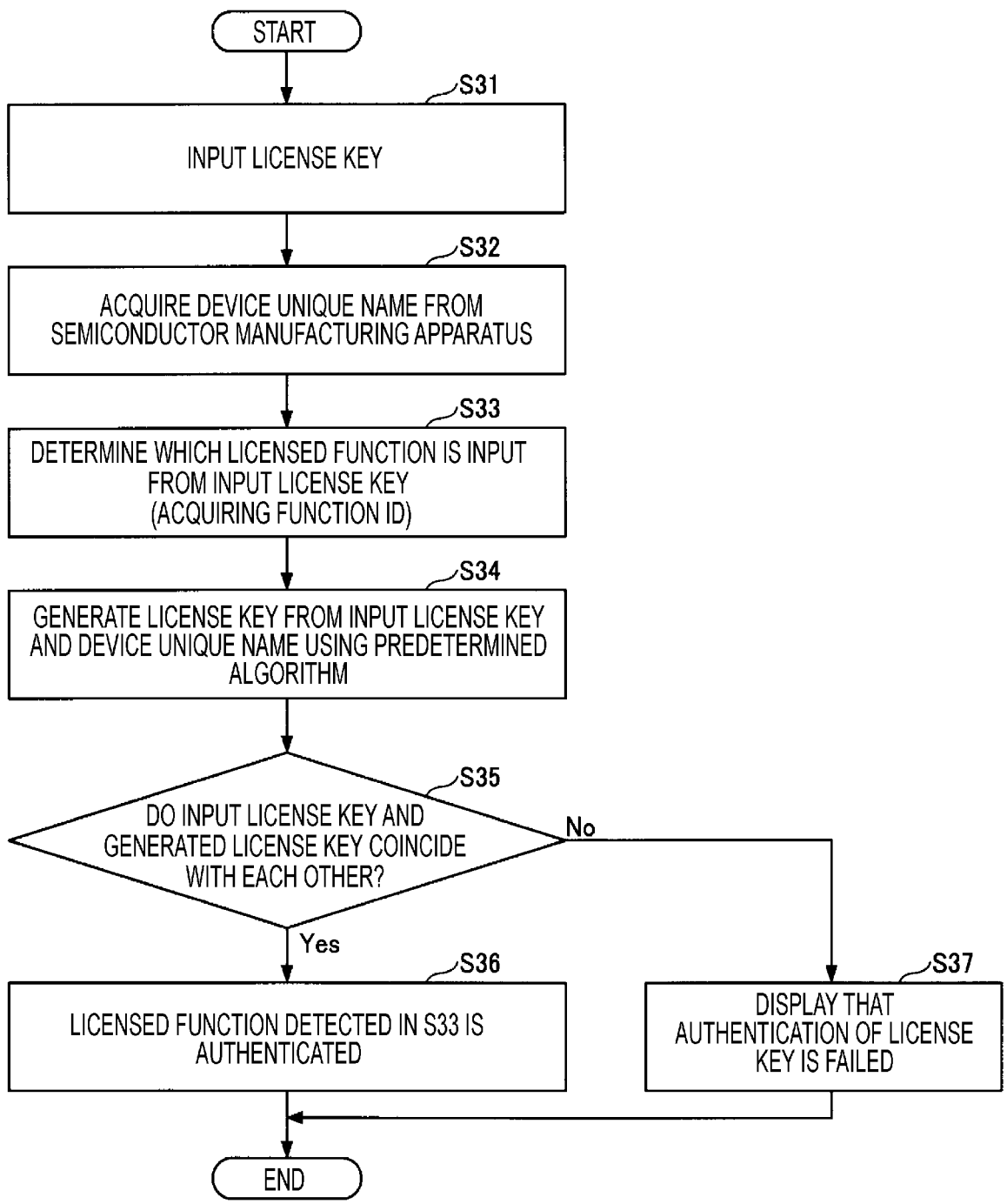
FIG. 11 illustrates an example of a flowchart illustrating a license authentication method in which the data processing device according to the present disclosure authenticates a license key.

FIG. 11 illustrates an example of a flowchart illustrating a sequence of a license authentication method in which the data processing device 50 authenticates the license key 105.

First, the information input receiving unit 56 receives the input of the license key 105 input to the license key input dialog 116 (step S31).

Subsequently, the acquiring unit 52 acquires the device unique name 102 from the semiconductor manufacturing apparatus 10 (step S32).

Subsequently, the second authentication information generating unit 57 determines which license key 105 of the licensed function is input from the input license key 105 (step S33). For example, the function ID 103 may be included in a certain digit of the license key 105, or the function ID 103 may be obtained by calculating a digit different from the certain digit of the license key 105.

Subsequently, the second authentication information generating unit 57 generates the license key 105 from the function ID 103 and the device unique name 102 using a predetermined algorithm (step S34).

The license determining unit 58 determines whether or not the input license key 105 and the generated license key 105 coincide with each other (step S35).

When they coincide with each other, the license determining unit 58 notifies the function license managing unit 59 that the function ID 103 and the licensed function are authenticated. The function license managing unit 59 registers the licensed function authenticated by corresponding to the function ID 103 (step S36).

When they done coincide with each other, the display control unit 51 displays that the authentication of the license key 105 is failed (the license key 105 is incorrect) (step S37).

As described above, in the present disclosure, the license key 105 that makes the licensed function valid is different from each semiconductor manufacturing apparatus 10. Therefore, although the license key 105 is leaked, it is possible to suppress diversion in another semiconductor manufacturing apparatus 10.

FIG. 12 illustrates a view illustrating a correspondence between a licensed function held by the function license managing unit 59 and an authentication state. FIG. 12 illustrates a part of information contained in the license file. As illustrated in FIG. 12, the license file holds a list of licensed functions as a file format, and holds each licensed function by corresponding whether it is unauthenticated or authenticated.

Further, the license file further includes the device identification code. The device identification code may be stored a file separated from the license file.

At the time of shipment from the factory, when there is a licensed function contracted (paid the price) by the customer, the person in charge of the factory may directly edit the license file in FIG. 12, instead of inputting the license key 105.

[Restoration Using Auxiliary Storage Device of Another Semiconductor Manufacturing Apparatus]

In the present disclosure, it has been described that, when a customer mounts the auxiliary storage device 504 of a second data processing device (the reference numeral 50b is assigned) on a first data processing device (the reference numeral 50a is assigned), the unauthorized use of the licensed function that is not authenticated in the first data processing device 50a may be suppressed. However, when the auxiliary storage device 504 of the first data processing device 50a fails, the auxiliary storage device 504 of the second data processing device 50b is mounted on the first data processing device 50a for restoration, and thus, the licensed function may be enabled in the first data processing device 50a. In the following, a sequence thereof will be described.

When the auxiliary storage device 504 (copied or original) of the second data processing device 50b is mounted on the first data processing device 50a, the device identification code 104 in the auxiliary storage device 504 and the device identification code 104 generated from the controller ID 101 and the device unique name 102 of the semiconductor manufacturing apparatus 10 do not coincide with each other. As a result, the user is unable to use the licensed function in the first data processing device 50a.

In this case, the service engineer inputs the device identification code 104 acquired in the sequence in FIG. 6 to the setting screen 100 of the licensed function.

Therefore, the license authentication button 112 becomes pressable, and the service engineer inputs the license key 105 acquired in the sequence in FIG. 9 to the setting screen 100 of the licensed function. The service engineer inputs the license key 105 for all licensed functions of which the customer pays the price.

Therefore, even when the auxiliary storage device 504 of the first data processing device 50a fails, the customer may continue the manufacturing of the semiconductor using the semiconductor manufacturing apparatus 10 if the second data processing device 50b is available. That is, the present disclosure easily achieves both the usability and suppression of the unauthorized use of the licensed function.

[Control Board Replacement]

Further, the control board 11 mounted on the semiconductor manufacturing apparatus 10 may fail. One of the measures taken by the service engineer is to replace the control board 11. In addition to the failure, the control board 11 may be replaced due to a version update of the control board 11, and the reason for replacing the control board 11 does not matter.

When a new control board 11 is mounted on the semiconductor manufacturing apparatus 10, the device identification code 104 in the auxiliary storage device 504 and the device identification code 104 generated from the controller ID 101 (in the control board 11) and the device unique name 102 of the semiconductor manufacturing apparatus 10 do not coincide with each other. As a result, the user is unable to use the licensed function in the semiconductor manufacturing apparatus 10.

In this case, the service engineer inputs the device identification code 104 acquired in the sequence in FIG. 6 to the setting screen 100 of the licensed function.

When the control board 11 is replaced (the auxiliary storage device 504 is not replaced), the information that the licensed function is authenticated, which is contained in the license file held by the function license managing unit 59, is not lost. As a result, when the service engineer inputs the device identification code 104, the licensed function is available.

Therefore, even when the control board 11 of the semiconductor manufacturing apparatus 10 fails, the customer continues the manufacturing of the semiconductor using the semiconductor manufacturing apparatus 10 if the control board 11 is replaced. That is, the present disclosure easily achieves both the usability and suppression of the unauthorized use of the licensed function.

[Version Update of Application]

The version of the application executed by the data processing device 50 may be updated. When the application in which the authentication using the device identification code 104 and the license key 105 is not introduced is updated to the version in which the authentication is introduced, the new application automatically creates the device identification code 104. Further, the licensed function that is valid before the version is updated is inherited in the authenticated state. Therefore, when the version is updated, additional work due to the introduction of the device identification code 104 is not required.

[Main Effects]

As described above, the data processing device 50 according to the present disclosure may suppress the unauthorized use of the licensed function by the hardware authentication (first-stage authentication), even when the auxiliary storage device 504 of another data processing device 50 in which the licensed function is valid is mounted on the data processing device 50. When there is a customer who mounts the auxiliary storage device 504 of the other data processing device 50 on one data processing device 50, the customer may be notified by an alarm.

Even when the hardware authentication is successful, the license key 105 for authenticating the licensed function is different for each semiconductor manufacturing apparatus 10 and each licensed function. Therefore, even when the licensed function is the same, the customer is unable to divert the license key 105 to another semiconductor manufacturing apparatus 10.

Further, USB media or the like is not required for authentication.

Even when the auxiliary storage device 504 fails or the control board 11 is replaced, the service engineer may restore them by the device identification code 104 and the license key 105 at the customer's site.

The semiconductor manufacturing apparatus of the present disclosure may be applied to any type of the apparatus of an atomic layer deposition (ALD) apparatus, a capacitively coupled plasma (CCP), an inductively coupled plasma (ICP), a radial line slot antenna (RLSA), an electron cyclotron resonance plasma (ECR), and a helicon wave plasma (HWP).

The present disclosure may provide a technology capable of more strongly restricting the unauthorized use of the function of the semiconductor manufacturing apparatus.

From the foregoing, it will be appreciated that various embodiments of the present disclosure have been described herein for purposes of illustration, and that various Modifications may be made without departing from the scope and spirit of the present disclosure. Accordingly, the various embodiments disclosed herein are not intended to be limiting, with the true scope and spirit being indicated by the following claims.

What is claimed is:

1. A license authentication device comprising:
acquisition circuitry configured to acquire first information and second information from a semiconductor manufacturing apparatus that provides a licensed function;
first authentication information generation circuitry configured to generate first authentication information including a device identification code based on the first information and the second information acquired by the acquisition circuitry; and
usage authority determination circuitry configured to, when the first authentication information generated by the first authentication information generation circuitry and including the device identification code, and the first authentication information including a default device identification code that is stored in advance in the license authentication device are not identical to each other, restrict use of the licensed function in the semiconductor manufacturing apparatus, thereby performing an authentication for the semiconductor manufacturing apparatus using hardware information of the semiconductor manufacturing apparatus that includes the device identification code and the default device identification code before performing an authentication for the licensed function using software information including identification information of the licensed function.

2. The license authentication device according to claim 1, wherein the acquisition circuitry acquires the second information from the semiconductor manufacturing apparatus, and
the license authentication device further comprises:
information input reception circuitry configured to receive input of second authentication information including a license key for authentication of the licensed function;
second authentication information generation circuitry configured to generate the second authentication information based on the second information acquired by the acquisition circuitry and the identification information of the licensed function acquired from the second authentication information; and
license determination circuitry configured to, when the second authentication information received by the information input reception circuitry and the second authentication information generated by the second authentication information generation circuitry are identical to each other, set licensed function specified by the identification information of the licensed function to be authenticated, thereby performing the authentication for the licensed function.

3. The license authentication device according to claim 2, wherein the first authentication information is stored in a non-volatile large-capacity storage medium provided in the license authentication device.

4. The license authentication device according to claim 3, wherein the first information and the second information are stored in a memory of the semiconductor manufacturing apparatus.

5. The license authentication device according to claim 4, wherein the first information is a MAC address, and the second information is a name unique to the semiconductor manufacturing apparatus.

6. The license authentication device according to claim 5, further comprising display control circuitry,
wherein, when the first authentication information is not stored in advance in the license authentication device,
the display control circuitry displays an alarm in a display indicating that the first authentication information is not stored, and
the usage authority determination circuitry does not restrict the use of the licensed function.

7. The license authentication device according to claim 5, further comprising display control circuitry,
wherein, when the generated first authentication information generated by the first authentication information generation circuitry and the stored first authentication information stored in advance in the license authentication device are not identical to each other,
the display control circuitry displays an alarm in a display indicating that the licensed function is unable to use, and
the usage authority determination circuitry restricts the use of the licensed function.

8. The license authentication device according to claim 7, wherein the semiconductor manufacturing apparatus is configured such that the first authentication information is able to be set from a setting screen after the semiconductor manufacturing apparatus is shipped from a factory.

9. The license authentication device according to claim 1, wherein the first authentication information is stored in a non-volatile large-capacity storage medium provided in the license authentication device.

10. The license authentication device according to claim 9, wherein the first information and the second information are stored in a memory of the semiconductor manufacturing apparatus.

11. The license authentication device according to claim 10, wherein the first information is a MAC address, and the second information is a name unique to the semiconductor manufacturing apparatus.

12. The license authentication device according to claim 1, further comprising display control circuitry,
wherein, when the first authentication information is not stored in advance in the license authentication device,
the display control circuitry displays an alarm in a display indicating that the first authentication information is not stored, and
the usage authority determination circuitry does not restrict the use of the licensed function.

13. The license authentication device according to claim 1, further comprising display control circuitry,
wherein, when the generated first authentication information generated by the first authentication information generation circuitry and the stored first authentication information stored in advance in the license authentication device are not identical to each other,
the display control circuitry displays an alarm in a display indicating that the licensed function is unable to use, and
the usage authority determination circuitry restricts the use of the licensed function.

14. The license authentication device according to claim 1, wherein the semiconductor manufacturing apparatus is configured such that the first authentication information is able to be set from a setting screen after the semiconductor manufacturing apparatus is shipped from a factory.

15. The license authentication device according to claim 1, wherein the first information includes a controller ID and the second information includes a name unique to the semiconductor manufacturing apparatus.

16. The license authentication device according to claim 15, wherein the device identification code is obtained from the controller ID and the name unique to the semiconductor manufacturing apparatus.

17. The license authentication device according to claim 1, wherein the identification information of the licensed function includes a function ID.

18. A license authentication method comprising:
providing a license authentication device for a semiconductor manufacturing apparatus that provides a licensed function that becomes available when an authentication is completed;
storing first authentication information in the license authentication device;
acquiring first information and second information from the semiconductor manufacturing apparatus;
generating first authentication information including a device identification code based on the first information and the second information acquired in the acquiring; and
when the generated first authentication information that is generated in the generating includes the device identification code, and the stored first authentication information in the storing are not identical to each other, the stored first authentication information including a default device identification code, restricting use of the licensed function in the semiconductor manufacturing apparatus, thereby performing an authentication for the semiconductor manufacturing apparatus using hardware information of the semiconductor manufacturing apparatus that includes the device identification code and the default device identification code before performing an authentication for the licensed function using software information including identification information of the licensed function.

19. The license authentication method according to claim 18, wherein the first information includes a controller ID and the second information includes a name unique to the semiconductor manufacturing apparatus.

20. The license authentication method according to claim 19, wherein the device identification code is obtained from the controller ID and the name unique to the semiconductor manufacturing apparatus.

* * * * *